United States Patent [19]

Butters et al.

[11] 3,931,432

[45] Jan. 6, 1976

[54] PRINTING PROCESS

[75] Inventors: Alan James Butters; Walter Peace, both of Manchester; James Duncan Pont, Reading, all of England

[73] Assignee: Imperial Chemical Industries Limited, London, England

[22] Filed: Dec. 26, 1973

[21] Appl. No.: 428,311

[30] Foreign Application Priority Data

Jan. 4, 1973 United Kingdom................... 493/73

[52] U.S. Cl. ................ 428/206; 427/256; 427/287; 427/288; 428/207; 428/209; 428/211
[51] Int. Cl.²......................................... B41M 1/00
[58] Field of Search............ 117/38, 139.5 A, 161 R, 117/161 UZ, 161 UH, 161 UB, 25; 260/37 P, 41 C, 34.2, 874; 427/197, 287, 288; 428/206, 207, 209, 211; 8/62

[56] References Cited
FOREIGN PATENTS OR APPLICATIONS

| | | |
|---|---|---|
| 941,305 | 11/1963 | United Kingdom |
| 1,052,241 | 12/1966 | United Kingdom |
| 1,122,397 | 8/1968 | United Kingdom |
| 1,123,611 | 8/1968 | United Kingdom |
| 1,143,404 | 2/1969 | United Kingdom |
| 1,198,052 | 7/1970 | United Kingdom |
| 1,231,614 | 5/1971 | United Kingdom |
| 7,201,474 | 10/1972 | Netherlands |

*Primary Examiner*—Thomas J. Herbert, Jr.
*Assistant Examiner*—Bruce H. Hess
*Attorney, Agent, or Firm*—Cushman, Darby & Cushman

[57] ABSTRACT

Process for gravure or flexographic printing of flexible substrates wherein the printing vehicle comprises a dispersion of film-forming polymer particles in an inert organic liquid, the dispersion being stabilised by a defined polymeric stabiliser and being of such a composition that after evaporation of not more than 50% by weight of the organic liquid the residue is a stable dispersion which can bleed homogeneously with fresh dispersion, and wherein the polymer particles are subsequently integrated upon the substrate.

10 Claims, No Drawings

PRINTING PROCESS

This invention relates to a printing process and more particularly to a process in which the printing vehicle is based on non-aqueous polymer dispersions.

The gravure process has been used for many years for the printing of flexible substrates such as paper, aluminium foil and various plastic films such as regenerated cellulose. The principle of this process is that a metal cylinder engraved with the printing design to a maximum depth of approximately 50 microns is partially immersed in a trough containing the ink or varnish. A doctor blade, which is in contact with this revolving cylinder, removes the ink or varnish from the non-printing areas and returns it to the ink trough. The ink or varnish remaining in the engraved printing areas is then transferred to the substrate being printed by direct contact with this substrate. The percentage of ink or varnish transferred to the substrate being printed depends to some extent on the absorbency of the substrate. The ink or varnish remaiing in the engraved printing areas must be soluble in the material in the ink trough otherwise there is a gradual build up in the engraving which reduces its effective depth with a resultant decrease in the thickness of the ink or varnish film applied. These redissolution properties required for satisfactory gravure printing are difficult to obtain with convertible coating resins or dispersions of resins which are film-forming at room temperature. Hence solutions the past it has been normal practice to use solution of non-convertible resins such as metallic rosinates, nitrocellulose, acrylic resins and vinyl resins in volatile solvents.

With the above mentioned types of synthetic resins it is difficult to obtain high gloss coatings on absorbent surfaces by gravure application because of the limitations on the film thickness which can be applied. Normally the gloss obtainable on an absorbent surface is dependent upon the degree of penetration of the resin into the surface. High molecular weight resins show less penetration into absorbent surfaces but generally give low solids content solutions in solvent and therefore unacceptable gloss.

Another method of application of low viscosity inks containing either organic solvent, water or mixtures of water and organic solvent is the flexographic printing process. The process involves the application of ink to the raised areas of rubber printing plates followed by these raised areas contacting the substrate and transferring the majority of the ink film to the substrate. Normally the printing plates are based on natural rubber but for specific applications involving strong organic solvents synthetic rubbers may be used. Conventionally when using natural rubber printing plates the inks used contain ethanol, water or ethanol/water mixtures.

For inks to be suitable for this application they should possess certain properties which are similar to those required in inks applied by the photogravure process: thus the inks should be stable to shearing and also they should possess good redissolution properties to avoid the build up of insoluble material on the printing portions of the plate.

Attempts have been made to use low viscosity aqueous dispersions of high molecular weight polymers as gravure and flexographic varnishes and ink vehicles but the redissolution properties are not good and the film obtained are sensitive to changes in temperature. Also the use of water-based inks creates difficulties with regard to the dimensional stability of absorbent surfaces such as paper.

It has now been found that these difficulties may be largely overcome by the use of inks and varnishes based on non-aqueous polymer dispersions.

According to the present invention there is provided a process for the gravure or flexographic printing of flexible substrates wherein the printing vehicle comprises a dispersion of particles of a synthetic film-forming polymer in an inert organic liquid in which the polymer is insoluble, the dispersion (a) being stabilised by a polymeric stabiliser which comprises an anchoring component which associates with the particles of disperse polymer and a component which is solvated by the organic liquid of the dispersion and provides a stabilising steric barrier around the particles, and (b) being of such a composition that after evaporation of not more than 50% by weight of the organic liquid present the residue remains as a stable dispersion capable of blending homogeneously with fresh dispersion, and wherein the polymer particles are subsequently integrated upon the substrate.

By "solvated" we mean that if the component of the polymeric stabiliser to which this term is applied were to exist as an independent molecule instead of forming part of the stabiliser, the organic liquid of the dispersion would be a thermodynamically good solvent for that component.

Stabilised dispersions of synthetic film-forming polymers suitable for use according to the present invention may be obtained by any of the methods known in the art. For example, the monomer or monomers from which the polymer is derived may be polymerised in an organic liquid, in which the monomers are soluble but the polymer is insoluble, in the presence of a polymeric stabiliser as hereinbefore defined.

As described in British Patent Specification No. 941,305, the polymeric stabiliser may be a block or graft copolymer. One polymeric constituent of the copolymer, the anchoring component, is compatible with the film-forming polymer of which the disperse particles are composed; this constituent is usually identical with, or at least closely related in composition to, the disperse polymer. The forces whereby the constituent in question is anchored to the disperse polymer are in this case of the Van der Waal type, or arise from actual entanglements of the chains of the anchoring component and the chains of the disperse polymer. Another polymeric constituent of the block or graft copolymer is capable of being solvated by the organic liquid of the dispersion in the sense defined above. The nature of this solvatable constituent is thus determined by the nature of the organic liquid, that is to say, both should be polar or both should be non-polar, whereas in contrast the disperse polymer will be non-polar or polar respectively. Such block or graft copolymer stabilisers may be pre-formed by random grafting of unsaturated monomers such as acrylic or methacrylic esters on to an unsaturated polymer such as degraded natural rubber, as described in British Patent Specification No. 941,305, or they may be made by copolymerisation of these monomers with a synthetic polymer containing an ethylenically unsaturated grouping, as described in British Patent Specification No. 1,052,241. One preferred form of the latter type of stabiliser has a polymeric backbone constituting the anchoring component and attached thereto on average at least five side chains of molecular weight at least 200 which are solvated by the dispersion liquid, the weight ratio of the side chains to the backbone being from 0.5:1 to 5:1. Such stabilisers are described in British Patent Specification No. 1,122,397. Another form of stabiliser is the product of a condensation reaction between a solvated component of molecular weight 500–5000 and a non-solvated component of molecular weight at least 250, the weight ratio of solvated to non-solvated components being from 0.5:1 to 5:1, as described in British Patent Specification No. 1,123,611. Alternatively, the polymeric stabiliser can be formed in situ by carrying out the polymerisation of the monomer or monomers, from which the disperse polymer is derived, in the organic liquid in the presence of a soluble polymer on to which the monomers can graft or with which the monomers can copolymerise, such a soluble polymer being, for example, the degraded natural rubber or the synthetic polymer containing an unsaturated grouping referred to above.

In a somewhat different type of stabiliser, as described in British Patent Specification No. 1,143,404, there is a polymeric constituent solvated by the organic liquid of the dispersion as before, but the anchoring to the disperse polymer particles is effected by strong specific interaction between polar groups in the stabiliser and complementary polar groups in the disperse polymer.

According to a further modification, described in British Patent Specification No. 1,231,614, any of the polymeric stabilisers referred to above may be additionally anchored to the disperse polymer particles by means of covalent linkages. This may be achieved either by providing the stabiliser with an unsaturated grouping which can copolymerise with the monomer or monomers from which the disperse polymer is derived during the formation of the latter, or by effecting a chemical reaction between reactive groups in the stabiliser and complementary reactive groups in the disperse polymer after the latter has been formed. This mode of stabilisation is preferred in the polymer dispersions for use according to the invention.

In a different approach to the production of stabilised dispersions of film-forming polymers, the polymer may exist as pre-formed polymer particles (obtained, for example, by an aqueous emulsion polymerisation process) which are dispersed in an inert organic liquid in the presence of a polymeric stabiliser as hereinbefore defined, as described in British Patent Specification No. 1,198,052. The polymeric stabilisers may thus in general be soluble polymers or graft copolymers carrying anchoring groups which interact either associatively or chemically with groups in the polymer molecules constituting the dispersed particles. In all cases the stabiliser provides a steric protective barrier at least 12 A thick.

The inert organic liquid may, although being as a whole a non-solvent for the disperse polymer, contain a proportion of liquid which is a solvent for the polymer, for example as described in our co-pending British Patent Applications Nos. 4121/71 and 58995/71.

The disperse polymer present in the printing vehicle used according to the invention may in general be a resin of either the convertible or the non-convertible type. In the case of a convertible polymer, the polymer will contain reactive groups which are capable of cross-linking with one another either by direct interaction or by mutual reaction with a multifunctional cross-linking agent, such as a urea-formaldehyde resin, a melamine-formaldehyde resin or an alkylated melamine-formaldehyde resin, also present in the vehicle. The cross-linking reaction may be initiated by heating or by the action of light or ultra-violet radiation, in the final stage of the process. The disperse polymer may be of any of the well known classes of synthetic polymers, including addition polymers and condensation polymers, and it may be a homopolymer, a copolymer or a mixture of two or more polymers or copolymers. One class of suitable polymers comprises addition polymers or copolymers derived from at least one ethylenically unsaturated monomer, for example the alkyl esters of acrylic and methacrylic acids such as methyl methacrylate, ethyl methacrylate, butyl methacrylate, methyl acrylate, ethyl acrylate and 2-ethylhexyl acrylate, acrylamide, methacrylamide, styrene, vinyltoluene, divinyl benzene, acrylonitrile, vinyl chloride, vinylidene chloride and vinyl acetate; where the disperse polymer is to contain reactive cross-linkable groups, monomers containing such groups, for example acrylic and methacrylic acids, the hydroxyalkyl and alkoxy alkyl esters thereof, and the methylol or alkoxymethyl derivatives of the amides thereof, may be included. Preferred polymers for use in the present invention are non-convertible polymers derived from ethylenically unsaturated monomers, especially homopolymer methyl methacrylate and copolymers thereof with alkyl esters of acrylic or methacrylic acid in which the alkyl groups contain from 2 to 8 carbon atoms, for example butyl acrylate and 2-ethylhexyl acrylate.

If desired, the disperse polymer may be "preplasticised", that is to say it may be made by a dispersion polymerisation process carried out not only in the presence of the polymeric stabiliser but also in the presence of a plasticiser, which may be either soluble or insoluble in the liquid phase of the dispersion.

The nature of the inert organic liquid which constitutes the continuous phase of the dispersion depends upon the composition of the disperse polymer in question; in general, it will have a different polarity to that of the polymer, so that the polymer is insoluble in it. However, as already indicated, the organic liquid may be a mixture of which one or more components are non-solvents for the polymer while one or more other components are solvents for the polymer, provided that the polymer is insoluble in the mixture as a whole. If the disperse polymer is polar, for example polymethyl methacrylate, examples of non-solvent liquids include aliphatic hydrocarbons such as hexane and heptane, alcohols such as methanol, ethanol and ethylene glycol monobutyl ether. Where the disperse polymer is non-polar, for example polystyrene, or a copolymer incorporating a major proportion of styrene, non-solvents include methanol, ethanol and ethylene glycol monomethyl ether.

Where it is desired to incorporate solvents for the polymer, these may be, for example, in the case of a polar polymer such as polymethyl methacrylate, esters such as ethyl acetate and 2-ethoxyethyl acetate, ketones such as acetone and aromatic hydrocarbons such as toluene and xylene and, in the case of a non-polar polymer such as a polymer or copolymer of styrene, the foregoing esters, ketones and aromatic hydrocarbons.

The dispersions used according to the invention may contain in addition to the disperse polymer, which is, of course, insoluble in the organic liquid of the dispersion, supplementary polymer which is in solution in the organic liquid. This supplementary polymer may be a polymer which is formed simultaneously with the disperse polymer; it may be a polymer which, unlike the disperse polymer, is soluble in the organic liquid in which the dispersion is actually produced or it may be a polymer which is insoluble in that liquid but which passes into solution on the subsequent addition to that liquid of certain constituents of the total organic liquid of the dispersion as used in the present process, as already described, The amount of the supplementary, soluble polymer present in the dispersions may be comparable with, or may even exceed, the amount of the insoluble disperse polymer.

It is an essential condition, for the purposes of the present invention, that the polymer dispersions used should be of such a composition that they remain stable and capable of blending homogeneously with fresh dispersion after the loss by evaporation of not more than 50% by weight of the organic liquid originally present. This requirement is necessary to ensure that any polymer solid which might remain in the cells of the gravure roller after a printing operation is immediately redispersed when the roller is contacted in the ink trough with fresh vehicle ready for the next impression, so that "filling-in" of the cells is prevented. Compliance with this condition can readily be determined by a simple "in vitro" test, in which a sample of the dispersion is evaporated so that only 50% by weight of the original liquid phase remains, and is then diluted with a large excess (e.g. 10 times its volume) of fresh dispersion. The resulting mixture must be homogeneous and free from "bits".

In the final stage of the process of the invention, the particles film-forming polymer are integrated upon the substrate. When the polymer has a glass transition temperature below ambient temperature, such integration may occur spontaneously: in such a case, it will usually be desirable for the polymer to be of the convertible type, so that by a further cross-linking step a relatively hard and tough film may be produced. On the other hand, when the polymer has a glass transition temperature appreciably above room temperature, it will usually be necessary to heat the printed substrate in order to achieve polymer particle integration. In these cases, the polymer may be either convertible or non-convertible. A final heating step may also be desirable for the purpose of ensuring complete removal of the organic liquid of the printing vehicle. Where a final heating step is employed, the temperature to which the film-forming polymer, or the polymer together with the inert organic liquid, is heated may conveniently be in the range of temperature normally adopted for the force-drying of a printed or varnished web in a gravure or flexographic printing process, that is to say from 80° to 150°C.

The dispersions may be used either as a printing varnish or, with addition of the appropriately dispersed pigment or pigments, as a printing ink. The solids content and viscosity of the varnish or ink may be adjusted to the correct level by addition of one or more organic liquids which may be the same as or different from the liquids constituting the medium in which the polymer dispersion was originally prepared.

The pigment dispersions which are added to the basic printing vehicle when inks are to be prepared are obtained by milling the desired pigment in an organic liquid, more especially a hydrocarbon liquid as mentioned above, in the presence of a dispersing agent.

Any suitable dispersing agent may be used, but particularly suitable agents are the following:

i. the agents described in our British Patent Specification No. 1,108,261, which are compounds of the formula:

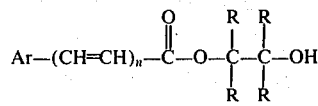

in which Ar is an aromatic group, $n$ is 0 or 1, from 2 to 3 of the R groups are individually H, $CH_3$ or $C_2H_5$ and the remaining R group or groups individually or the remaining $R - C - C - R$ group in combination provides a solvatable chain-like component of at least 12 atoms linked in linear series;

ii. the agents described in our British Patent Specification No. 1,159,252, which comprise an addition polymer chain solvated by the organic liquid of the dispersion and having attached thereto at least one group of the formula:

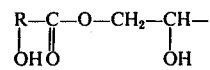

where R is an aliphatic radical which may contain one or more additional hydroxyl groups;

iii. reaction products of the dispersants described in British Patent Specification Nos. 1,108,261 and 1,159,252 referred to above with an organic monoisocyanate or with an organic diisocyanate which has already been, or is simultaneously or subsequently, reacted with an alcohol or an amine so that it behaves as a monoisocyanate. These dispersants are more fully described in our copending British Patent Applications Nos. 42760/70 and 54130/70.

iv. dispersants comprising one or more polyesters or salt thereof derived from a hydroxycarboxylic acid of the formula $HO - X - COOH$, wherein X is a divalent saturated or unsaturated aliphatic radical containing at least 8 carbon atoms and in which there are at least 4 carbon atoms between the hydroxyl and carboxylic acid groups, or from a mixture of such a hydroxy-carboxylic acid and a carboxylic acid which is free from hydroxyl groups. These dispersants are more fully described in our copending British Patent Application Nos. 60903/70 and 27768/71.

v. dyestuffs (which are also dispersing agents) having the formula:

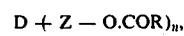

wherein D is the radical of a dyestuff which is attached to Z through a carbon atom of an aromatic ring present in D; Z is a divalent bridging group; n is a positive integer having a value from 1 to 8, and R is the radical of a carboxy-ended polyester RCOOH derived from a hydroxycarboxylic acid of the formula $HO - X - COOH$, X being a divalent saturated or unsaturated aliphatic radical containing at least 8 carbon atoms and in which there are at least 4 carbon atoms between the hydroxyl and carboxylic acid groups, or from a mixture of such a hydroxycarboxylic acid and a carboxylic acid which is free from hydroxyl groups. These dispersing agents and their preparation are more fully described in our copending British Patent Application No. 4445/71.

vi. a dispersing agent comprising the adduct of one or more compounds from each of the following classes:

a. an organic compound containing two or more isocyanate groups
b. an organic compound containing two or more hydroxyl, primary amino or secondary amino groups which are reactive with isocyanate groups and
c. a compound of the formula $$Z-X-E-(-T-D-)_{n-1}Q,$$

wherein Z represents —OH or —NHR, R being a monovalent hydrocarbon radical; X is an optionally substituted divalent hydrocarbon radical; T is a divalent hydrocarbon radical, n is a positive integer, Q is an optionally substituted monovalent hydrocarbon radical and E is a $$\begin{matrix} O \\ \| \\ -C-O- \end{matrix}$$

group or a $$\begin{matrix} O & R' \\ \| & | \\ -C-N- \end{matrix}$$

group where R' is a hydrogen atom or a monovalent hydrocarbon radical, and D is a $$\begin{matrix} O \\ \| \\ -C-O- \end{matrix}$$

group, provided that only one of E and D is connected to T via the carbon atom of the carboxyl group present in D and E, and the compound contains at least one chain having at least 5 carbon atoms. These dispersing agents and their preparation are more fully described in our copending British Patent Application No. 9033/72.

The pigments may be those which have been conventionally employed in the preparation of printing inks.

The printing vehicles, whether ink or varnish, will generally have a solids content in the range 20 to 70% by weight and a viscosity from 16 to 40 seconds (No. 4 Ford cup at 20°C).

The printed surfaces obtained according to the present process have good resistance to dilute acid and alkali, ultraviolet liquid and to rubbing.

The invention is illustrated but not limited by the following Examples in which parts and percentages are by weight.

EXAMPLE 1

This example shows the preparation of a gravure varnish from a dispersion in aliphatic hydrocarbon of a 95:5 methyl methacrylate/butyl acrylate copolymer preplasticised in the proportions of 83:17 by weight with a polyester plasticiser. By preplasticised is meant that the plasticiser is incorporated in the dispersion during the polymerisation of the monomers.

A 'seed' polymer dispersion is first formed by polymerising a dilute solution of methyl methacrylate in refluxing aliphatic hydrocarbon, using azodiisobutyronitrile as initiator, in the presence of a graft copolymer stabiliser. The stabiliser is obtained by condensing glycidyl methacrylate with poly(12-hydroxystearic acid), copolymerising the product with methyl methacrylate and glycidyl methacrylate in the ratios of 49:45:6 by weight, and finally reacting some of the free glycidyl groups with p-nitrobenzoic acid, and with methacrylic acid.

Into the 'seed' dispersion is uniformly fed a mixture of methyl methacrylate and butyl acrylate in the appropriate proportions together with azodiisobutyronitrile initiator, further graft copolymer stabiliser, a mercaptan chain transfer agent for molecular weight control and a solution in aromatic solvents of a polyester plasticiser made by reacting neopentyl glycol, adipic acid and monobutyl phthalate, in molar ratios of 3:2:1.55, to a final acid value of less than 5 mg.KOH/g. Sufficient of the feed mixture is added to bring the total solids content of the dispersion to approximately 50%, and completion of the feed is followed by a further period of heating at reflux. The final dispersion has a solids content of of 50.4%. To 67 parts of this dispersion are then added with stirring 33 parts of di(methylcyclohexyl)phthalate. The resulting gravure varnish has a solids content of 66.8%, and gives satisfactory prints on a gravure machine running at 450 ft. per min. with heating at 110°C for 3 seconds.

EXAMPLE 2

Xylene (12.34 parts) and an aromatic petroleum distillate of b.p. 160°–175°C (5.69 parts) are mixed, and to this mixture is added with stirring 73.75 parts of a preplasticised dispersion of a 95:5-methyl methacrylate/butyl acrylate copolymer of 51.4% solids content. When mixing this complete, there is added with stirring a premix of further aromatic petroleum distillate (5.69 parts), ethylene glycol diacetate (2.47 parts) and a 2% solution in xylene of a dimethylsilicone oil (0.06 part). The resulting gravure varnish has a solids content of 37.9% and gives satisfactory prints on a gravure machine running at 400 ft. per min. with heating at 110°C for 3 seconds.

The preplasticised polymer dispersion used in this Example is prepared in the same manner as that described in Example 1 but employing a ratio of polymer to plasticiser solids of 80:20.

EXAMPLE 3

To the varnish of Example 2 (62.5 parts) there is added with stirring a thinner mixture (37.5 parts) having the following composition:

| | |
|---|---|
| Aliphatic petroleum distillate, b.p. 140–160°C | 30 parts |
| Xylene | 25 parts |
| 2-Ethoxyethyl acetate | 25 parts |
| Ethylene glycol diacetate | 20 parts |

The resulting varnish has a solids content of 23.7% and gives satisfactory prints on a gravure machine running at 400 ft. per min. with heating at 110°C for 3 seconds.

EXAMPLE 4

Xylene (6.39 parts) and an aromatic petroleum distillate of b.p. 160°–175°C (2.95 parts) are mixed, and to the mixture there is added with stirring 67.16 parts of a preplasticised dispersion of a 95.5-methyl methacrylate/butyl acrylate copolymer of 49.4% solids content. When mixing is comple there is added with stirring 23.50 parts of the thinner mixture described in Example 3. The resulting gravure varnish has a solids content of 33.2% and gives satisfactory prints on a gravure machine running at 400 ft. per min. with heating at 110°C for 3 seconds.

The preplasticised polymer dispersion used in this Example is prepared in the same manner as that described in Example 1 but employing a ratio of polymer to plasticiser solids of 50:50.

EXAMPLE 5

This Example illustrates the production of a printing ink from the gravure varnish described in Example 4.

To the varnish described in Example 4 (71.43 parts) there is added with stirring a 33% solids dispersion of a blue pigment (28.57 parts). The pigment dispersion is obtained by milling β-form copper phthalocyanine in a substantially aliphatic petroleum fraction of b.p. 100°–120°C in the presence of a dispersing agent, essentially as described in Example 15 of our copending British Patent Application No. 4445/71.

The ink, when applied by the gravure process on to paper or moisture-proof regenerated cellulose film has the adhesion, gloss and flexibility required for flexible packaging.

EXAMPLE 6

This example illustrates the preparation of a gravure ink by direct pigmentation of the gravure varnish quoted in Example 1.

5.6 parts by weight of Rubine Toner 4B are dispersed into 31.9 parts by weight of gravure ink medium quoted in Example 1 containing 66.8% solids in a ball mill or other suitable piece of equipment for pigment dispersion. After dispersion of the pigment, 62.5 parts by weight of gravure ink medium quoted in Example 1 are added in three equal portions, each portion being incorporated by efficient stirring or milling prior to adding the subsequent portion to avoid flocculation or shock to the pigment.

This ink gives satisfactory prints on a gravure machine running at 400 ft per minute with heating at 100°C for 2 seconds.

EXAMPLE 7

This example illustrates the preparation of a gravure ink by producing a dispersion of pigment in a solution of zinc rosinate in a substantially aliphatic petroleum fraction of b.p. 100°–120°C followed by incorporation of a gravure medium made by the method described in Example 1.

1 part by weight of a coated Benzidine yellow pigment (Monolite Yellow BGL-PX) is dispersed in 4 parts by weight of a 50% solution of zinc rosinate (containing 9% zinc calculated as metal) in a substantially aliphatic petroleum fraction of b.p. 100°–120°C by ball milling or dispersing on one of the other pieces of equipment commonly used for this purpose.

15 parts by weight of gravure ink medium prepared as described in Example 1 are incorporated in three equal portions into the pigment dispersion by stirring. The mixture is stirred until homogeneous after each addition to avoid pigment shock or flocculation.

This ink gives satisfactory prints on a gravure machine running at 400 ft. per min. with heating for 2 seconds at 100°C.

What we claim is:

1. A process for the gravure or flexographic printing of flexible substrates wherein the printing vehicle comprises a dispersion of particles of a synthetic film-forming polymer, which is a homopolymer of methyl methacrylate or a copolymer thereof with alkyl esters of acrylic or methacrylic acid in which the alkyl groups contain from 2 to 8 carbon atoms, in an inert organic liquid in which the polymer is insoluble, the dispersion (a) being stabilized by a polymeric stabilizer which is a block or graft polymer one polymeric constituent of which, being an anchoring component which associates with the particles of disperse polymer, is compatible with the polymer of which the disperse particles are formed and another polymeric constituent of which is solvated by the organic liquid of the dispersion, to provide a stabilizing steric protective barrier at least 12 A thick, and (b) being of such a composition that after evaporation of not more than 50% by weight of the organic liquid present the residue remains as a stable dispersion capable of blending homogeneously with fresh dispersion, and wherein the polymer particles are subsequently integrated upon the substrate, said printing vehicle having a solids content in the range of 20 to 70% by weight and a viscosity of from 16 to 40 seconds measured in a No. 4 Ford cup at 20°C.

2. A process as claimed in claim 1, wherein the block or graft copolymer stabiliser is pre-formed and has a polymeric backbone constituting the anchoring component and attached thereto on average at least five side chains of molecular weight at least 500 which are solvated by the liquid of the dispersion, the weight ratio of the side chains to the backbone being from 0.5:1 to 5:1.

3. A process as claimed in claim 2, wherein the polymeric stabiliser is additionally anchored to the disperse polymer particles by means of covalent linkages.

4. A process as claimed in claim 3, wherein the inert organic liquid, whilst being as a whole a non-solvent for the disperse polymer, contains a proportion of a liquid which is a solvent for the polymer.

5. A process as claimed in claim 4 wherein the disperse polymer is a convertible polymer containing reactive groups and wherein in a final stage a cross-linking reaction is effected between the reactive groups either by direct interaction or by mutual reaction with a multifunctional cross-linking agent.

6. A process as claimed in claim 4, wherein the disperse polymer is a non-convertible polymer derived from one or more ethylenically unsaturated monomers.

7. A process as claimed in claim 1, wherein the disperse polymer is a preplasticised polymer made by a dispersion polymerisation process carried out in the presence of a plasticiser which is either soluble or insoluble in the liquid of the dispersion.

8. A process as claimed in claim 1, wherein the polymer particles are integrated upon the substrate by heating to a temperature of from 80° to 150°C.

9. The process of claim 1 wherein said printing vehicle also contains a dispersed pigment or pigments.

10. A flexible substrate printed by a gravure or flexographic process as claimed in claim 1.

* * * * *